Jan. 15, 1957 B. SVIRSKY 2,777,460
CONVERTIBLE BALL COCK
Filed March 5, 1954 2 Sheets-Sheet 1
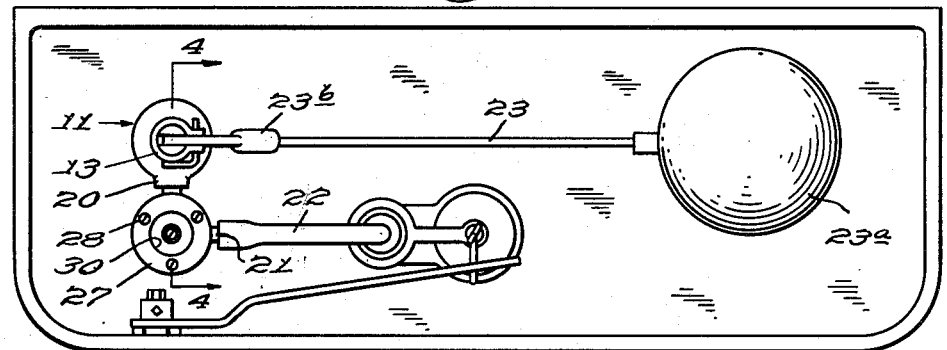
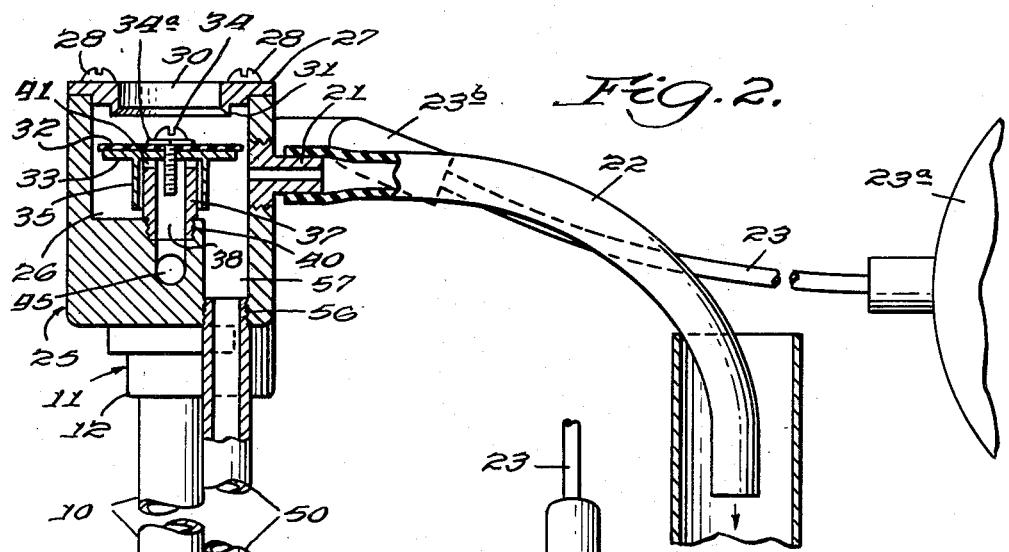
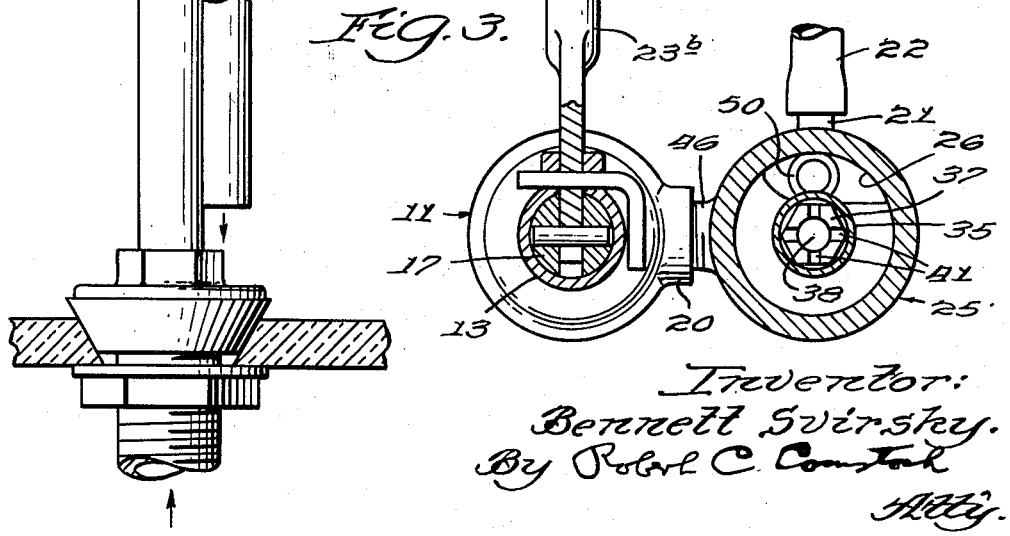
Inventor:
Bennett Svirsky.
By Robert C. Comstock
Atty.

Jan. 15, 1957  B. SVIRSKY  2,777,460
CONVERTIBLE BALL COCK
Filed March 5, 1954  2 Sheets-Sheet 2
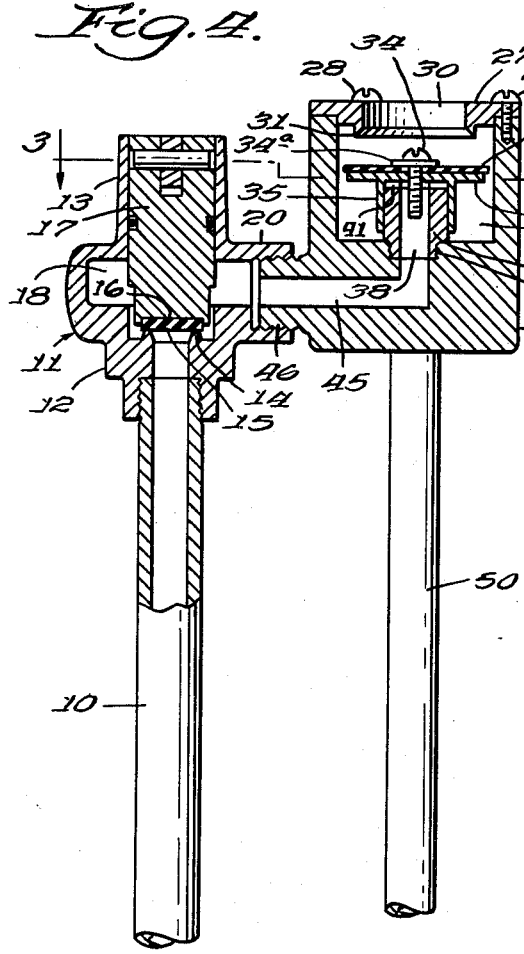
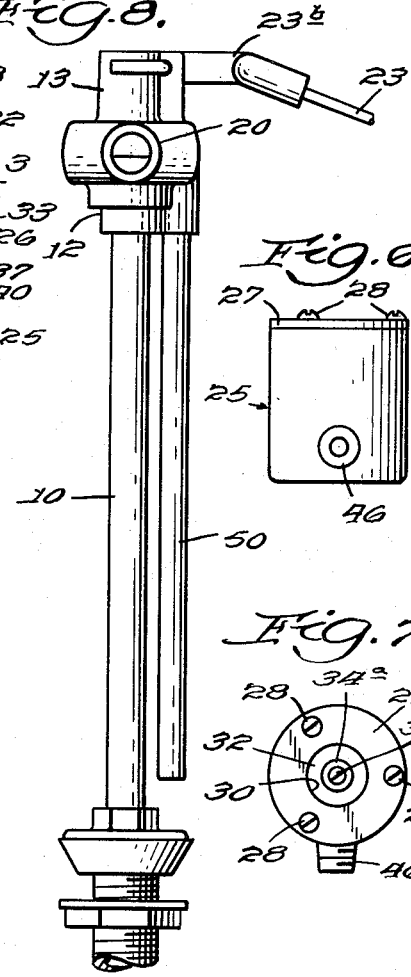
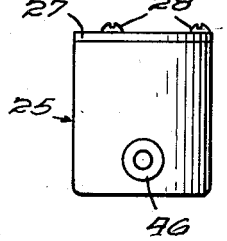
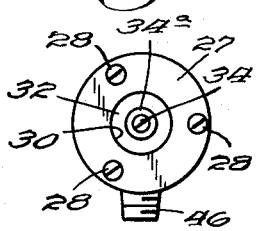
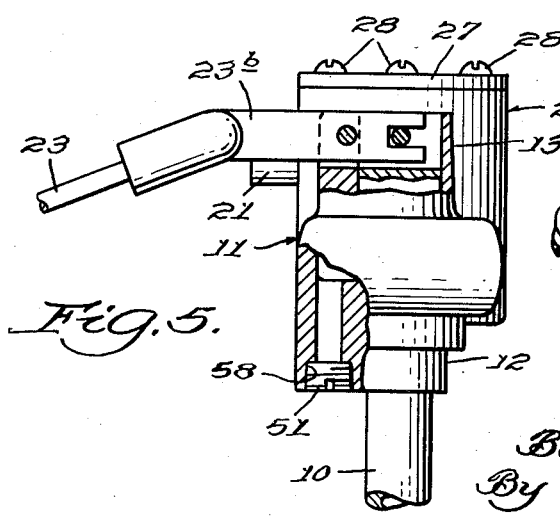
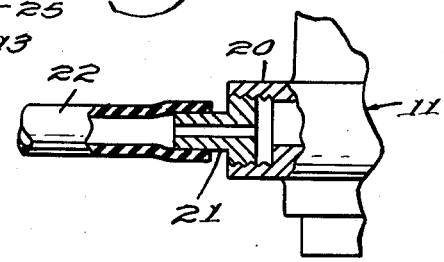
Inventor:
Bennett Svirsky.
By Robert C. Comstock
Atty.

United States Patent Office 2,777,460
Patented Jan. 15, 1957

2,777,460

CONVERTIBLE BALL COCK

Bennett Svirsky, Los Angeles, Calif., assignor of one-half to Sidney Breier, Los Angeles, Calif.

Application March 5, 1954, Serial No. 414,335

4 Claims. (Cl. 137—218)

This invention relates to a ball cock which may be converted before or after installation from a non-antisyphoning to an antisyphoning ball cock, or vice versa.

In many localities, the law does not require an antisyphoning device. Where this is true, there is a highly competitive market which requires an extremely simple and inexpensive ball cock assembly. It has been found, however, that due to changes of the law, incorporation of areas into cities, rezoning and other changes in the laws and regulations, antisyphoning devices often become required after the plumbing has been installed.

In the past, this has meant that the entire ball cock assembly must be removed and discarded, being replaced with a new one having an antisyphoning device. This is necessarily costly, both in the waste of materials and in the labor required in making this change.

It is an object of my invention to provide a non-antisyphoning ball cock assembly which is simple, quiet, and responsive and which is capable of competing costwise for use in localities where no antisyphoning device is required. It is a further object of my invention to provide such a ball cock which may easily and quickly be converted into an antisyphoning ball cock before or after it has been installed without discarding the ball cock, refill tube or hush tube, and with a minimum amount of labor.

With my invention, the only additional part which is required to convert my ball cock to an antisyphoning device is the antisyphoning head itself. The changes required are simply and quickly accomplished and there is no waste of parts or materials.

Another object of my invention is to provide a ball cock which is readily convertible by the manufacturer or distributor either from an antisyphoning device to a non-antisyphoning device or vice versa. It is often difficult to anticipate the demand for the different types of ball cocks and a manufacturer or distributor will often find that he has a large supply of one type on hand, while the orders call for the other type. With my ball cock, it is possible to readily and economically convert the ball cock either to or from an antisyphoning ball cock and thus fill orders for either type.

It is a further object of my invention to provide an improved antisyphoning device for use with my ball cock which is novel in construction and unusually efficient in operation, with a movement which responds more readily to the flow of water. It is more particularly an object of my invention to provide an antisyphoning device having an externally polygonal tubular water inlet means around which is fitted a vertically slidable bonnet having a circular skirt which cooperates with the apices of the polygonal sides to provide a substantially frictionless mounting for the bonnet, to provide air passages for antisyphoning, to provide limited passages for rapid lifting of the bonnet due to water flow and to prevent canting of the bonnet.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the accompanying drawings, illustrative of a preferred embodiment of the invention, Fig. 1 is a top plan view looking down into the toilet tank, the lid having been removed. In this view the complete antisyphoning ball cock provided by my invention is shown installed within the toilet tank, the lever for tripping the flushing mechanism being fragmentarily shown;

Fig. 2 is an enlarged, fragmentary, part elevational and part sectional view looking at the antisyphoning side of the device, a fragment of the floor of the tank being included in the view;

Fig. 3 is a fragmentary transverse section on line 3—3 of Fig. 4;

Fig. 4 is a fragmentary, partly sectional and partly elevational view, the plan of section being indicated by line 4—4 on Fig. 1;

Fig. 5 is a fragmentary elevational view of the head of a non-antisyphoning ball cock illustrating the same as it appears after it has been converted into an antisyphoning ball cock. A portion of this view is broken away and sectioned to illustrate interior structure;

Fig. 6 is an elevational view of the antisyphoning device per se;

Fig. 7 is a top plan view of the device shown in Fig. 6;

Fig. 8 is a fragmentary elevational view of the non-antisyphoning ball cock before it has been converted into an antisyphoning ball cock;

Fig. 9 is a fragmentary elevational view, with parts in section, of the non-antisyphoning ball cock prior to its conversion into an antisyphoning ball cock illustrating the coupling member for attaching the refill tube.

Referring in detail to the drawings, and briefly describing first the principal parts of my convertible ball cock, atop an upstanding supply pipe 10 is mounted a cavitated cap structure 11 with a basal body portion 12 and a tubular upper end portion 13. Body portion 12 is provided with an upwardly facing valve seat 14 with which cooperates a valve disk 15 contained in a recess 16 provided for it in the lower end of a vertically reciprocally movable plunger 17. The lower end portion of said plunger centrally occupies a valve chamber 18.

An outlet member 20 extends horizontally from one side of cap structure 11. Outlet member 20 is provided with internal screw threads. The internally threaded part of outlet member 20 has screwed into it a tubular coupling member 21, the small passage through which forms an outlet from said chamber 18 and suitably reduces the flow through a resilient refill tube 22 which has one of its end portions tightly fitted over coupling member 21 as shown in Fig. 9 when no antisyphoning device is used. It it not necessary or desirable in a non-antisyphoning ball cock that said outlet member 20 be larger than required to deliver the small stream required for the refill tube, but its large size adapts it to serve as a mounting and water passage means for the antisyphoning attachment, as will later be explained. A float rod 23 carries at one end a float 23a and has its opposite end connected with a plunger operating means 23b.

The antisyphoning device which is adapted to be attached to my ball cock comprises a cylindrical casing 25 having a cavitated upper portion forming in its upper part a cylindrical chamber 26. The top of chamber 26 is partially closed by an annular cover 27 which is removably held in place by screws 28 which are directed downwardly into the upper part of casing 25. Cover 27 has through it a spacious central aperture 30, the lower side of which is circumscribed by a circular, downwardly directed lip 31, forming a downwardly facing valve seat with which cooperates at times an elastic washer 32 forming a facing for a circular valve disk 33. Washer 32 is secured to valve disk 33 by means of a screw 34, with which cooperates a washer 34a. During refilling of the tank, lip 31 and washer 32 cooperate to prevent upward spurting of the water from the casing 25. Disk 33 carries a central circular skirt portion 35, the diameter of said skirt portion being considerably less than the diameter of said disk.

The valve member or bonnet which comprises disk 33 and skirt 35 is slidably mounted upon a hexagonal member 37 having a vertical axial passage 38. Hexagonal member 37 has at its lower end a diametrically reduced screw threaded projection 40 which is screwed into a circular recess provided for it in the basal part of casing 25.

The upper end portion of hexagonal member 37 has a plurality of radial grooves or kerfs 41 (see Fig. 3) cut thereinto which, in combination with the flat sides of hexagonal member 37, form air vents under the disk 33 when the latter is seated upon the intact portions of the part 37 which occupy the spaces between kerfs 41.

Within casing 25 is an L-shaped passage 45, the vertical limb of which communicates with passage 38 through hexagonal member 37. The horizontal limb of passage 45 has a diametrically expanded screw threaded outer end portion 46 which is adapted to be screwed into the outer end portion of outlet member 20 of my ball cock structure.

It should be noted that since skirt 35 is round and hexagonal member 37 is polygonal in cross section, small air passages are created between the sides of skirt 35 and hexagonal member 37. The inside of skirt 35 contacts the apices of hexagonal member 37 and is prevented from tipping, canting, or other sideward movement. There is little friction in the movement of skirt 35, which is held so that it can move only directly upwardly or downwardly. Other shapes instead of a hexagon may be used, so long as they achieve the results of providing small passages for air or water to move between the walls of skirt 35 and hexagonal member 37 and simultaneously act as a substantially frictionless guide to require direct vertical movement of skirt 35 with respect to hexagonal member 37.

In use, when water enters my antisyphon valve through passage 38, its pressure forces disk 33 upwardly until washer 32 forms a seal against lift 31. It may be noted that with my construction, the narrowness of the passages between the sides of hexagonal member 37 and skirt 35, together with the width of disk 33, prevents any water from possibly passing around disk 33 without raising it and sealing off aperture 30 to prevent any water from escaping therethrough. The narrowness of the passages through which the water must pass necessarily results in a rapidly responsive upward resting movement of disk 33 to seal off aperture 30.

It is impossible for a vacuum to develop in the water supply line and draw water back from hush tube 50 because when disk 33 is resting on hexagonal member 37, air is free to enter through aperture 30 into chamber 26. The air then flows through the passages between the sides of hexagonal member 37 and skirt 35, through kerfs 41 into passages 38 and 45 into chamber 18 of the ball cock and back to the water supply line. The vacuum is thus broken by the flow of air, which prevents any undesirable back flow of possibly contaminated water into the water supply line.

Referring to Fig. 2 of the drawings, casing 25 is provided at one side thereof with a screw threaded opening in which coupling 21 may be inserted. Coupling 21 is adapted to receive around the end thereof the resilient end of the refill tube 22. The bottom of casing 25 is provided with another screw threaded opening 56 which is adapted to receive and hold the screw threaded end of the hush tube 50. It may be noted that from this point of view, hexagonal member 37 is mounted on a shelf, which drops off at the right side to provide a passage 57 which leads to opening 56 and hush tube 50.

Referring to Fig. 5 of the drawings, when hush tube 50 is attached to the antisyphoning device, a screw threaded plug 51 is inserted into an opening 58 in which the end of hush tube 50 was formerly mounted.

When my ball cock is to be converted to an antisyphoning device, the following steps are taken. The hush tube 50 is removed from the opening 58 is body portion 12 of the ball cock. The plug 51 is screw threaded into the position formerly occupied by the end of hush tube 50 to plug off opening 58. The same hush tube 50 is then inserted into opening 56 in the bottom of casing 25 of the antisyphoning device.

The refill tube 22 and coupling 21 are removed from outlet member 20 of the ball cock. The antisyphoning device is then mounted by screw threading on the inside of outlet member 20 in place of coupling 21. The same coupling 21 is attached to the antisyphoning device and refill tube 22 is then mounted on coupling 21. My ball cock is now an antisyphoning ball cock.

If a manufacturer desires to convert and assemble an antisyphoning ball cock into a non-antisyphoning ball cock, he need only reverse the operations described above.

I claim:

1. In water control means for a toilet tank, a housing having a supply chamber therein, a supply pipe communicating with the interior of said chamber, a float operated valve for controlling the admission of fluid mounted in said supply chamber, a tubular outlet member extending laterally from one side of said supply chamber, an antisyphon body having a horizontal inlet communicating with the interior thereof, a tubular member projecting laterally from said antisyphon body at the horizontal inlet for engagement with the outlet member of the supply chamber, a tubular coupling member having an inner part fitted into an opening in a side of said antisyphon body and an outer part projecting from the body, and a discharge tube having one end part slidably fitted on said outer part of the tubular coupling member, said inner part of the tubular coupling member being adapted to be removed from said antisyphon body and to engage the interior of the said supply chamber outlet member when said antisyphon body is detached from the supply valve housing for non-antisyphon use of the supply housing.

2. Water control means as claimed in claim 1 wherein said tubular coupling member projecting from the antisyphon body threadedly engages the interior of the tubular outlet member of the supply housing, said coupling member having a part of greater diameter than its adjacent outer part threaded in an opening in the wall of the antisyphon body for threaded engagement with the interior of the outlet member of the supply housing.

3. In a water control means for a toilet tank, a housing having a chamber therein, a supply pipe communicating with said chamber, a float operated valve for controlling the admission of fluid into said supply chamber, the chamber having a tubular internally threaded outlet at one side thereof, an antisyphon casing at one side of said supply housing having a chamber therein, said casing having a top wall provided with an opening therethrough, the lower part of said antisyphon casing having a horizontal inlet passage communicating with the bottom of a vertical inlet passage, a tubular member extending laterally from the outer end of said inlet passage of the antisyphon casing and externally threaded to engage the outlet of said supply housing, an upstanding tubular discharge member on said vertical passage and having a plurality of external flat faces contacting at vertical apices, said discharge member having grooves extending from the inner to the outer surfaces at its outer end, an inverted cupped valve member slidably fitted on the apices of said discharge member and having a cylindrical interior contour, the top closed end of said valve member being disposed to engage the top of the casing and close the opening therein when said valve member is raised, a coupling member attached to the side of the antisyphon casing, said coupling member having an inner part threaded in an opening in the casing, and an outer part on said coupling member projecting from the casing to telescopically engage one end of a tube to discharge water from the casing into the tank, said inner part of the coupling member being adapted to be detached from the antisyphon casing to fit within said outlet of the supply chamber when the antisyphon device is detached from the supply valve housing.

4. In water control means for a toilet tank, a supply housing adapted for connection with a supply pipe, a liquid level responsive valve in said housing for controlling the admission of water to said housing, a tubular outlet member extending laterally from one side of said supply housing, an antisyphon body having an inlet passage communicating with the interior thereof, a tubular member projecting laterally from said antisyphon body at the inlet for engagement with said outlet member of the supply housing, and a tubular coupling member having an inner part fitted into an opening in a side of said antisyphon body, and adapted to engage the tubular outlet of the supply housing when the antisyphon body is removed from the supply housing.

References Cited in the file of this patent

UNITED STATES PATENTS

| | | | |
|---|---|---|---|
| 376,799 | Engstrom | Jan. 24, | 1888 |
| 1,541,538 | Tunnell | June 9, | 1925 |
| 1,649,620 | Siefen | Nov. 15, | 1927 |
| 2,226,350 | Sloan | Dec. 24, | 1940 |
| 2,247,525 | Sherwood | July 1, | 1941 |
| 2,283,973 | Criss | May 26, | 1942 |
| 2,299,706 | Svirsky | Oct. 20, | 1942 |
| 2,303,037 | Fredrickson | Nov. 24, | 1942 |
| 2,325,956 | Holtman | Aug. 3, | 1943 |
| 2,412,760 | Svirsky | Dec. 17, | 1946 |
| 2,590,386 | Dobrick | Mar. 25, | 1952 |
| 2,595,937 | Graham | May 6, | 1952 |
| 2,635,622 | Owens | Apr. 21, | 1953 |